Patented Aug. 18, 1925.

1,550,160

UNITED STATES PATENT OFFICE.

GUSTAF HÅKANSON, OF VISKAFORS, SWEDEN.

METHOD OF PRODUCING IMPRESSED MOLDS FOR USE IN THE MANUFACTURE OF ARTICLES OF SOFT RUBBER AND THE LIKE.

No Drawing.  Application filed November 23, 1923. Serial No. 676,612.

*To all whom it may concern:*

Be it known that I, GUSTAF HÅKANSON, a citizen of Sweden, residing at Viskafors, Sweden, have invented certain new and useful Method of Producing Impressed Molds for Use in the Manufacture of Articles of Soft Rubber and the like, of which the following is a specification.

The present invention relates to a method for the manufacture of articles of a material capable of being impressed and to produce molds therefor so that the articles with respect to the surface decoration may have a resemblance to sewed, knitted, embroidered or like fabrics.

When manufacturing such articles it has hitherto been customary to press the objects in a mold of metal or the like. Said mold has usually been obtained from a pattern, which by hand or by machine is given such a surface, so that the article pressed in the mold obtained from said pattern receives the intended decoration upon its surface. If it be desired, however, to procure by this method an article the surface of which illusorily resembles the surface of a fabric, the mold to be used or the pattern for making the mold must be carefully engraved or treated in a similar way in order, that the extraordinary fine stripings or stripplings of the surface of the weaved, knitted embroidered or like fabric may appear upon the surface of the mold. Naturally this makes the manufacture very expensive without ensuring the full resemblance with the surface of the fabric, so that the application in the practice of such a method is quite impossible economically.

The object of this invention is a method in the manufacture of impressed articles, the surfaces of which have a resemblance to sewed, knitted, embroidered or like fabrics.

Another object of this invention is a method to procure molds suited to be used when impressing objects the surfaces of which have a resemblance to fabrics as mentioned.

A further object of this invention is a method to remove the patterns used for the procuring of such molds as mentioned, which patterns comprise sewed, knitted, embroidered or similar treated fabrics.

The method may preferably be used in the manufacture of clothes, carpets and similar objects of soft india-rubber, and hereinafter the invention will be more clearly described as carried out in the manufacture of such articles.

When carrying out the method for the manufacture of rubber clothes or the like, there is used a plastic non-vulcanized mass or body of india-rubber of such a composition, that the same when vulcanized will be transferred into so-called hard rubber (ebonite). Upon the surface of the non-vulcanized and consequently still plastic rubber mass there is placed the fabric which is to be used as a pattern whereby the fabric is impressed as deep as may be requisite to attain the intended result. By means of vulcanization under pressure the rubber mass is then transferred into ebonite, whereby the slightest as well as the bigger depressions and elevations corresponding perfectly to the surface of the fabric become fixed on the surface of the ebonite body. When the vulcanization is finished the fabric pattern, which has a disposition to adhere to the vulcanized rubber, gets destroyed.

When the hard rubber mold is to be manufactured a plastic rubber mass nonvulcanized is used, which owing to its plastic structure is sticky, so that the textile pattern is bent to adhere. After being vulcanized under pressure to an ebonite body the textile pattern must be separated from the mold, which is extremely difficult to be done by hand or by mechanical tools. In accordance with this invention such a separating is extraordinarily facilitated thereby that the textile pattern becomes destroyed by treating same with an acid, which carbonizes the fibrous textile material.

The ebonite body is then used as a mold when casting and vulcanizing therein a soft rubber mass of a suitable composition, whereby the objects receive a surface which in the slightest detail conforms with the surface of the fabric which has been used as a pattern for the mold.

Rubber clothes and carpets manufactured in accordance with this invention may be used as a base protection for toilet services on washstands and as carpets in bathrooms or elsewhere where a soft waterproof carpet is desired which can be easily washed and dried.

Having now particularly described and ascertained the nature of my said invention and in what manner the same is to be performed, I declare that what I claim is:—

1. A method of manufacturing impressed molds of vulcanized india-rubber for articles of soft rubber, which concerning their surface decoration exactly resemble textile fabrics, consisting in pressing a textile pattern on the surface of a non-vulcanized rubber mass, vulcanizing said rubber mass to a hard consistence with the textile pattern remaining in place and destroying the textile pattern since the vulcanizing has been completed, leaving a vulcanized hard rubber mold with impressions and intaglios exactly corresponding to the surface of the textile pattern ready for use for the manufacture therein of soft rubber articles.

2. A method of manufacturing impressed articles of soft rubber with a surface decoration resembling textile articles consisting in making a mold of a plastic mass of rubber with use of a textile pattern vulcanizing said mold to a hard rubber consistence with the textile pattern in place, destroying said textile pattern by treating same with an acid, removing what remains of said destroyed pattern, and pressing articles of soft rubber in said mold.

In testimony whereof I hereunto affix my signature.

GUSTAF HÅKANSON.